Patented May 15, 1923.

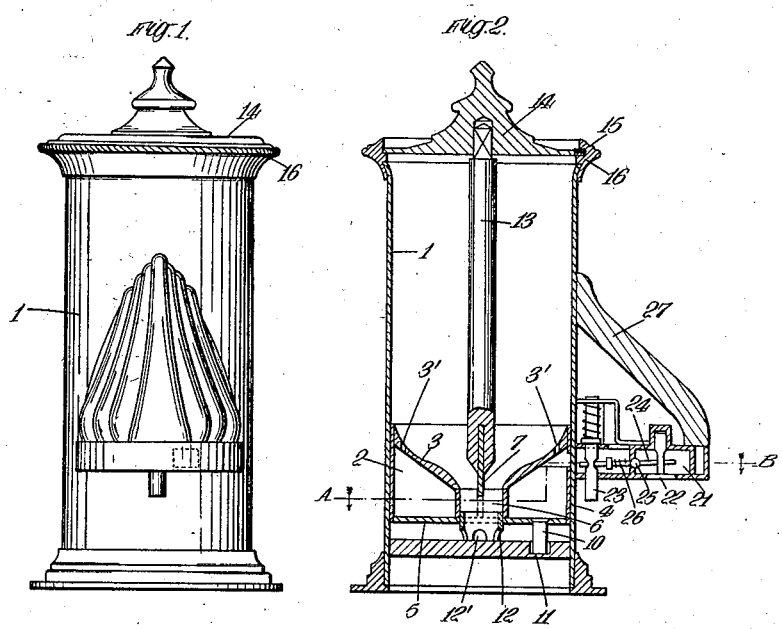

1,455,333

UNITED STATES PATENT OFFICE.

ALFRED JOHN GREAVES, OF PECKHAM RYE, LONDON, ENGLAND.

RECEPTACLE FOR MUSTARD AND OTHER CONDIMENTS.

Application filed February 27, 1922. Serial No. 539,704.

*To all whom it may concern:*

Be it known that I, ALFRED JOHN GREAVES, a subject of the King of Great Britain, residing at 11, Rye Hill Park, Peckham Rye, in the county of London, England, have invented certain new and useful Improvements in or Relating to Receptacles for Mustard and Other Condiments, of which the following is a specification.

This invention has reference to receptacles for mustard and other condiments and has for its object to provide improved means for maintaining the contents of the receptacle in a usable condition for a comparatively long time and for ejecting a limited quantity when desired.

The invention will be hereinafter described as providing a receptacle for mustard for which purpose it is particularly suitable although it will be understood that it is not confined thereto.

The invention consists in a receptacle having a mixing chamber located therein and means whereby a quantity of mustard is introduced by suction into said mixing chamber and ejected from the receptacle by successive movements of one part or member of said chamber relatively to the other part or parts.

The said mixing chamber is preferably divided into two compartments into which a quantity of mustard is sucked upon movement of the said movable part in one direction, movement of the said movable part in the other direction causing the mustard in one of said compartments to be returned to the body of the receptacle thereby agitating the mustard and preventing separation of the thicker and watery portions while the mustard in the other of the said compartments is expelled from the mixing chamber and discharged from the receptacle.

Vanes extending across the said compartments subdivide each of them into two the arrangement being such that upon each movement of the said movable part mustard is drawn into one subcompartment and expelled from another back into the receptacle while at the same time a quantity of mustard in a third subcompartment is discharged from the receptacle.

The mustard discharged from the receptacle is received into a delivery chamber or conduit provided with a discharge valve adapted to be opened against the action of a spring or the like by means of a pin which preferably is so located that when it is rested on the edge of a plate the weight of the receptacle will cause the opening of the valve so that the mustard expelled from the receptacle is permitted to fall on to the plate.

In order that the invention may be clearly understood and readily carried into effect I will now proceed to describe the same more fully with reference to the accompanying drawings in which:—

Figure 1 is a front elevation.

Figure 2 is a longitudinal section taken at right angles to Figure 1.

Figure 3 is an underneath plan view of the mixing chamber and

Figure 4 is a sectional plan taken on the line A—A in Figure 2.

The body of the receptacle which is shown as of cylindrical form is denoted by the numeral 1 and the mixing chamber located therein by 2. The mixing chamber is preferably provided with a conical or dished top 3, a side wall 4, and a bottom 5, the top and side being rotatable relatively to the bottom, and the aperture 6 extending through the top and bottom. Dividing the mixing chamber into two compartments is the partition 7, while carried by the bottom 5 are the upstanding vanes 8, 8' which subdivide each compartment into two. Formed in the said bottom are slots 9, and formed on or carried by the said bottom 5 is a pin or projection 10 adapted to engage in a recess 11 in the bottom of the receptacle so as to prevent more than a limited movement of the said bottom 5. The mixing chamber 2 is spaced from the bottom of the receptacle by the spacing member 12 having apertures 12' therein to permit the mustard to pass freely through the aperture 6. In order to permit the escape of air from the mixing chamber any desired number of holes 3' may be made in the top 3.

Secured to the partition 7 of the mixing chamber is the spindle 13 which at its upper part is provided with a square or other suitable end fitting within a socket in the lid or cover 14. The lid or cover 14 is formed with a slot or recess in which engages a pin or stud 15 projecting inwardly from the rotatable ring 16 spun on or otherwise rotatably secured to the body of the receptacle. It will be obvious that if desired the lid 14 and ring 16 may be rigidly secured together or may be made integrally. With this arrangement a movement of rotation of the ring 16 occasions movement of the spindle 13 and with it the top 3 and wall 4 of the mixing chamber 2. Complete rotation is however prevented by the vanes 8, 8'. The top 3 and wall 4 of the mixing chamber therefore are capable only of an oscillating movement at the beginning of each oscillating movement the bottom 5 of the mixing chamber and with it the vanes 8, 8' also moving to the extent permitted by the engagement of the pin 10 in the recess 11. Formed in the wall 4 of the mixing chamber is a circumferential slot 18 (Figure 4) in which engages a projection or hook 17 carried by the vane 8' while formed in the body 1 of the receptacle is an orifice 19 (Figure 4) with which the slot 18 is adapted to register, the movement of the bottom 5 bringing the projection 17 on vane 8' to one side or the other of the said orifice 19.

The movement of the partition 7 over the orifice 9 in the bottom will cause a quantity of mustard to be drawn upwardly into the mixing chamber through the orifices 9 due to the partial vacuum produced as the partition 7 moves away from the vanes 8 or 8', part of said mustard upon movement of the partition in the reverse direction being squeezed between the said partition and the vane 8 and expelled again, the mustard thereby being kept in a state of agitation thus effectually preventing any tendency towards separation of the watery portion from the heavier or thicker portion thereof. As will be obvious from the drawings at each movement of the partition 7 mustard will be drawn into one of the subcompartments on the left of the partition (see Figure 4) and expelled from the other. The mustard which is drawn into the compartment on the right hand of the partition 7 (see Figure 4) however will be squeezed between said partition 7 and the vane 8' and discharged through the slot 18 and orifice 19 into the conduit 20 leading to the chamber 21 the outlet from which is controlled by the valve 22. The valve 22 is adapted to be actuated by the spring pressed pin 23 through the medium of the spindle 24, which at one end passes through or is attached to the pin 23 and at the other end is attached to the valve stem, the arrangement being such that when the pin 23 is raised the valve will be depressed to permit the discharge of the mustard from the chamber 21. The spindle 24 passes through an orifice in the wall of the chamber 21 and is provided with a ball or swelling 25 adapted to be held closely in position by a spring 26 in order to prevent leakage of mustard from the said chamber 21. Obviously the ball 25 and spring 26 may be replaced by a rubber packing or other equivalent means if desired.

When it is desired to discharge a quantity of mustard on to a plate the receptacle is placed so that the pin 23 rests on the plate near the rim thereof the weight of the receptacle causing the valve 22 to open so that when the ring 16 is turned a supply of mustard will be delivered onto the plate and the act of withdrawing the receptacle from the plate will cause the edge of the latter to scrape or wipe off any mustard adhering to the bottom of the chamber 21.

In order to improve the appearance of the receptacle a cover plate 27 of any suitable ornamental shape is preferably provided.

If desired a float forming a sliding fit within the body 1 may be provided to rest upon the body of mustard and assist in preventing the access of air thereto.

It will be understood that I do not desire to confine myself to the exact construction and arrangement of the parts described as many modifications coming within the spirit of the invention may be made thereto if desired.

What I claim and desire to secure by Letters Patent of the United States is:—

1. A receptacle for mustard and other condiments having a mixing chamber provided with orifices and located in the receptacle and means for simultaneously introducing by suction and ejecting quantities of mustard into and from the chamber through the said orifices.

2. A receptacle for mustard and other condiments having a mixing chamber with orifices, a delivery outlet, a valve controlling the outlet, a pin for operating the valve, and means for alternately introducing and ejecting mustard to and from the chamber through the same orifices and ejecting mustard from the delivery outlet simultaneously, the pin for operating the valve being actuated by the weight of the receptacle when lodged on the outer margin of a plate.

3. A receptacle for mustard and other condiments having a mixing chamber therein provided with orifices and fitted with a partition and vanes dividing the chamber into compartments, a valve controlled delivery outlet communicating with the chamber, a pin for operating the valve of the delivery outlet, and means for moving the partition and vanes relatively to each other and to the receptacle for alternately introducing and ejecting mustard into and from the chamber and ejecting mustard from the valve controlled outlet, the pin for operating the valve being actuated by the weight of the receptacle when lodged on the outer margin of a plate.

4. A receptacle for mustard and other condiments having a mixing chamber with orifices, a delivery outlet, a valve controlling the outlet, a spring controlled pin, a pivotally mounted spindle engaging the valve and pin, and means for alternately introducing and ejecting mustard to and from the chamber through the same orifices and ejecting mustard from the delivery outlet simultaneously, the pin for operating the valve being actuated by the weight of the receptacle when lodged on the outer margin of a plate.

5. A receptacle for mustard and other condiments having a mixing chamber with orifices and fitted with a partition and vanes dividing the chamber into compartments, a delivery outlet communicating with the chamber, a valve controlling the outlet, a spring controlled pin, a pivotally mounted spindle engaging the valve and pin and means for moving the partition and vanes relatively to each other and to the receptacle for alternately introducing and ejecting mustard into and from the chamber and ejecting mustard from the valve controlled outlet simultaneously, the pin for operating the valve being actuated by the weight of the receptacle when lodged on the outer margin of a plate.

ALFRED JOHN GREAVES.